United States Patent [19]
Holmes et al.

[11] Patent Number: 5,588,418
[45] Date of Patent: Dec. 31, 1996

[54] SAW ASSEMBLY WITH HANDLE-ACTUATED GUIDE MECHANISM

[75] Inventors: William K. Holmes, Simi Valley; Albert E. Joneikis, Long Beach; Kwok W. Wong, Walnut, all of Calif.

[73] Assignee: Boart Longyear Company, Salt Lake City, Utah

[21] Appl. No.: 390,306

[22] Filed: Jan. 26, 1995

[51] Int. Cl.⁶ ........................................ B28D 1/04
[52] U.S. Cl. .............................. 125/13.01; 125/14
[58] Field of Search .................. 125/13.01, 13.03, 125/14

[56] References Cited

U.S. PATENT DOCUMENTS

| | | | |
|---|---|---|---|
| 3,722,497 | 3/1973 | Hiestand et al. | 125/14 |
| 3,763,845 | 10/1973 | Hiestand et al. | 125/14 |
| 4,134,459 | 1/1979 | Hotchen | 125/14 |
| 4,184,719 | 1/1980 | Ward | 125/14 |
| 4,836,494 | 6/1989 | Johnsen | 125/14 |
| 4,979,412 | 12/1990 | Anders | 83/397 |
| 4,986,252 | 1/1991 | Holmes et al. | 125/21 |
| 5,078,119 | 1/1992 | Holmes et al. | 125/21 |
| 5,165,285 | 11/1992 | Johnsen | 125/14 |

FOREIGN PATENT DOCUMENTS 717604  10/1954  United Kingdom ................ 125/14

OTHER PUBLICATIONS

Brochure entitled "Team MECO Concrete Cutting Equipment by Masterpiece Engineering Company", Masterpiece Engineering Company, California (no date) (incomplete).

Brochure entitled "HWS–112 12 H.P. Hydraulic Wall Saw", Diamond Tech, Inc., Roseville, California (no date) (incomplete).

Brochure entitled "Gearmec Hydraulic Wall Saw DSM 700 S", Hoffman Diamond Products, Inc., Punxsutawney, PA (no date) (incomplete).

Primary Examiner—Robert A. Rose
Attorney, Agent, or Firm—Darby & Darby, P.C.

[57] ABSTRACT

A wall saw for cutting concrete or similar materials includes a track, mounting brackets to affix the track to a wall, and a movable saw carriage. The saw carriage is mounted to the track by a guide mechanism, which may include a plurality of rollers, mounted to the carriage for pivotal movement between an engaged position, in guiding contact with the track, and a retracted position, out of contact with the track, by movement of a carrying handle of the carriage. In one embodiment, the rollers are mounted for pivotal camming motion and are retracted sufficiently in their retracted positions to permit mounting and dismounting of the carriage relative to the track by movement of the carriage perpendicular to the wall.

31 Claims, 5 Drawing Sheets

SAW ASSEMBLY WITH HANDLE-ACTUATED GUIDE MECHANISM

BACKGROUND OF THE INVENTION

The present invention relates to carriage-mounted saw assemblies and, more particularly, to a concrete-cutting saw having a handle-actuated guide mechanism.

It is often desirable to cut openings in walls, including those made of concrete, stone, and other hard materials. Such cuts are best made using a saw mounted to a carriage for movement along a track attached to the wall. The carriage is typically guided along the track by a plurality of rollers or other guide elements bearing against contact surfaces on opposite sides of the track. Saws of this type are disclosed in U.S. Pat. Nos. 3,722,497; 3,763,8.45; 4,986,252; and, 5,078,119. Also of this type are a Meco WS-25 wall saw manufactured by Masterpiece Engineering Company of Orange County, California; a HWS-112 wall saw of Diamond Tech Incorporated, Roseville, Calif.; a DSM 700S wall saw of Gearmec Sweden AB; and a Wandsage-System Type RZ wall saw of Hydrostress AG. In each of these structures, the elements that guide the saw carriage also serve to retain the carriage in position on the track.

In the foregoing devices, a carriage can be mounted to or released from a track by retracting rollers holding the carriage in place. The rollers can be moved individually or the carriage itself can be split apart to move the rollers on one side of the track away from those on the other side. The process of disengaging the rollers thus requires significant attention on the part of an operator and undesirably complicates the mounting/dismounting procedure. The operator must remove one hand from the saw's carrying handles to move the rollers or split the carriage. During the maneuver, the saw must be held in position on the track, usually by leaning against it or supporting it with a leg or a shoulder. This can be extremely awkward and difficult to accomplish, due to the weight of the saw, its position on the wall, and peculiarities of the worksite. For example, wall saws are often mounted and operated from atop stepladders, scaffolds and swing stages, each of which can present a highly unstable work platform.

Another problem inherent in some prior wall saws is that the rollers do not retract sufficiently to permit the carriage to be moved directly toward or away from the track in a direction perpendicular to the wall being cut. It is then necessary to move the carriage laterally over the cut line to mount it or dismount it. This greatly complicates the mounting and dismounting procedures, especially when the saw is used to cut a line flush with an adjoining wall or other obstruction.

It is therefore desirable in many applications to provide a track-mounted saw which is simple and easy to use, and which can be mounted to or dismounted from its track without releasing a hand from the saw itself.

SUMMARY OF THE INVENTION

The structure of the present invention is a carriage-mounted saw assembly which can be affixed to or removed from its track by moving one or more carrying handles to actuate a plurality of rollers or other guide elements between engaged and retracted positions. This permits the saw to be set up and operated by a single operator without difficulty or excessive effort. It also enables the guide elements to be retracted sufficiently for the carriage to be either mounted or dismounted by simply moving the carriage perpendicular to the wall.

These and other advantages are achieved by the saw assembly of the present invention, which comprises: a track mountable to the surface of a wall or other structural member to be cut; a carriage guided by the track for movement along the length of the track, the carriage including a cutting mechanism and at least one carrying handle for manually grasping the carriage; and a guide mechanism removably securing the movable carriage to the track, the guide mechanism mounted to the carriage for pivotal movement between an engaged position, in guiding contact with the track, and a retracted position, out of contact with the track, by movement of the carrying handle. In a preferred embodiment, the guide mechanism comprises a plurality of rollers or other guide elements contacting the track in the engaged position, and the rollers move between the engaged and retracted positions in a pivotal camming motion about respective secondary axes displaced from the primary axes of the rollers. The rollers may be actuated for these purposes by either pivoting or displacing the carrying handle relative to the carriage.

DESCRIPTION OF THE PREFERRED EMBODIMENTS

Figure 1:
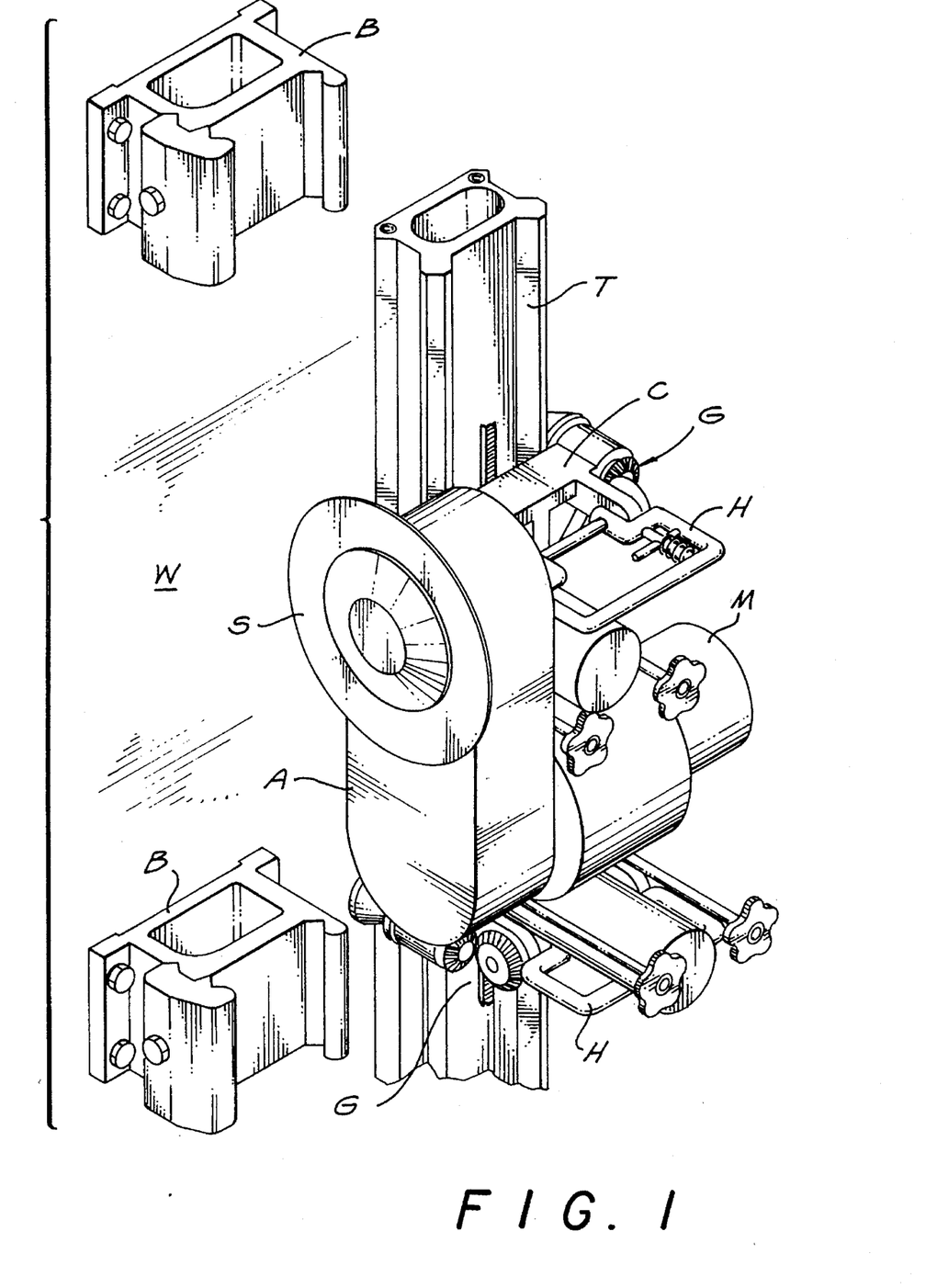
FIG. 1 is a partially-exploded perspective view of a wall saw assembly constructed according to one embodiment of the invention.

Referring now to the drawings, specifically FIG. 1 thereof, a wall saw constructed in accordance with one embodiment of the present invention has a carriage C drivably mounted on a track T, which is attached to a wall W by brackets B A saw motor M rides on the carriage C to drive a saw blade S through a saw arm A. The carriage C is affixed to and released from the track T by guide mechanisms G which are actuable by moving carrying handles H.

Figure 2:
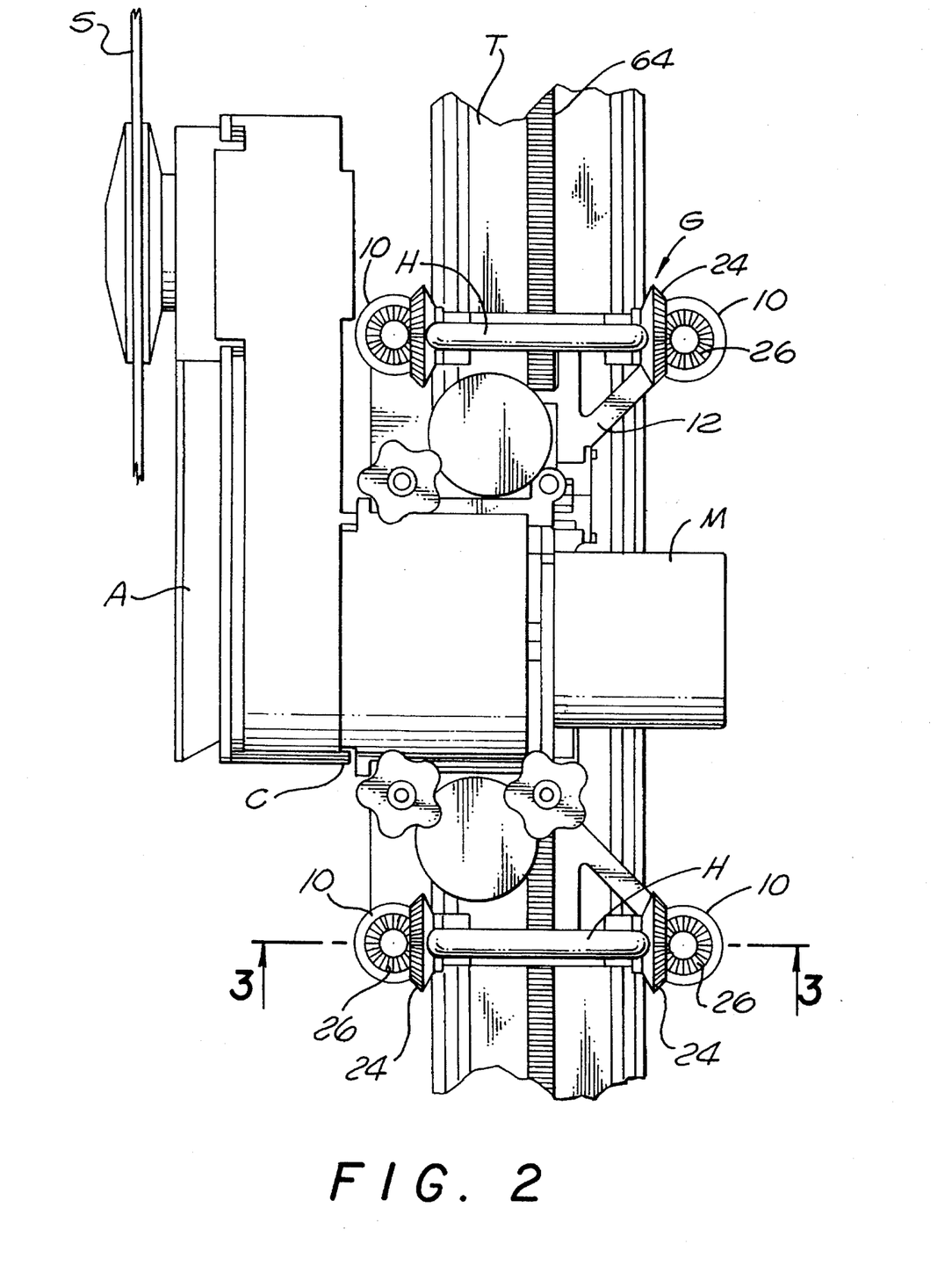
FIG. 2 is top plan view of the saw assembly of FIG. 1.
Figure 3:
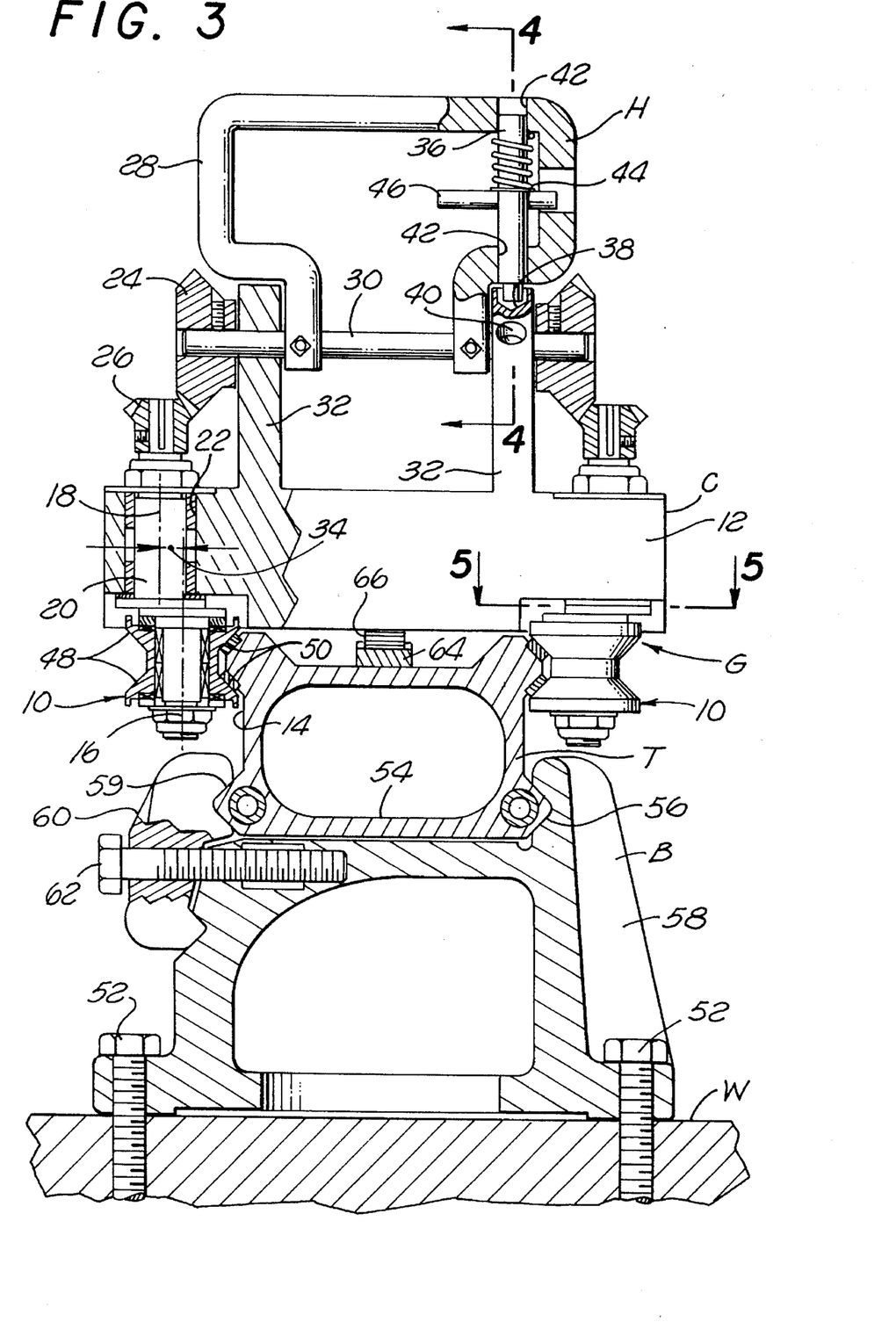
FIG. 3 is a partial vertical sectional view taken along the line 3—3 of FIG. 2 to show the carriage and releasable guide mechanism off the saw assembly.

The guide mechanisms G are illustrated most clearly in FIGS. 2 and 3, wherein pairs of guide elements in the form of concave rollers 10 are located at either end of a base 12 of the carriage C to engage an upper guiding portion 14 of the track T. Each of the rollers 10 is mounted for rotation about its own "primary" axis 16 as the carriage traverses the track, and is also mounted for pivotal movement about a "secondary" pivot axis 18 by an attached pivot post 20 which is journaled within an opening 22 of the carriage base 12.

The pivot posts 20, and therefore the rollers 10, are driven for pivotal movement about the secondary pivot axis 18 by the handle H acting through beveled gears 24 and 26. The handle H has a roughly U-shaped frame 28 mounted for swinging movement about a handle pin 30 which extends through upstanding ears 32 of the carriage base 12. The beveled gears 24 are carried at the outer ends of the handle pin 30 to engage the beveled gears 26 of the pivot posts 20. Thus, swinging movement of the carrying handle H creates controlled pivotal movement of the pivot posts 20, and therefore the rollers 10, camming the rollers inwardly and outwardly relative to the guiding portion 14 of the track T.

Figure 5:
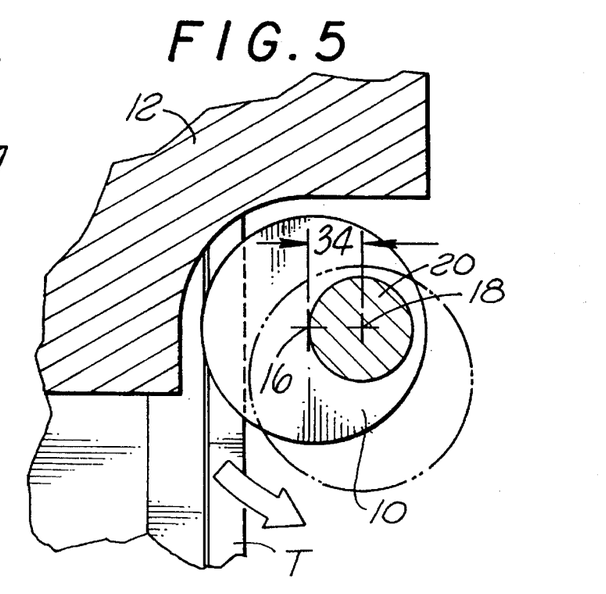
FIG. 5 is a fragmentary horizontal sectional view of the carriage taken along the line 5—5 of FIG. 3 to show its eccentric camming structure.

The movement of the rollers 10 between their engaged position, in contact with the guiding portion 14 of the track T, and their retracted position, in which they are disengaged from the track T so that the carriage C can be moved toward or away from the track T for mounting or dismounting purposes, can be seen most clearly in FIG. 5. The full-line position of the roller 10 illustrated in FIG. 5 corresponds to the engaged position illustrated in FIG. 3, whereas the phantom line position of the roller (FIG. 5) represents its retracted position. As stated above, movement between these two positions occurs by rotation of the pivot posts 20 under the influence of the handles H due to the displacement 34 between the primary roller axis 16 and the secondary pivot axis 18. The rollers 10 are therefor "cammed" inwardly and outwardly relative to the track T, making the mechanism relatively tolerant of minor deviations in angular position.

Figure 4:
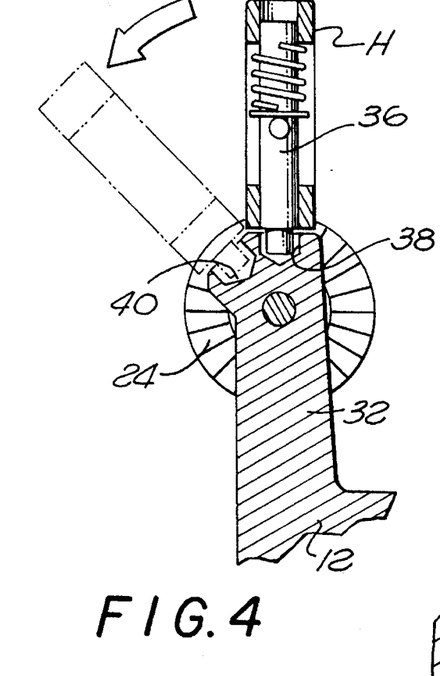
FIG. 4 is a fragmentary vertical sectional view of the carrying handle of the saw assembly taken along the line 4—4 of FIG. 3.

Referring again to FIG. 3, the gearing between the handle frame 28 and the pivot posts 20 is determined by the relative numbers of teeth in the beveled gears 24 and 26. In the illustrated embodiment, the beveled gear 24 has twice as many teeth as the beveled gear 26 so that the guide mechanism G, and thus the rollers 10, are actuable between their engaged and retracted positions by a relatively small swinging motion of the handle frame 28. Thus the ninety degree movement of the pivot posts 20 illustrated in FIG. 5 can be achieved by rotating the handle forty-five degrees. This rotated position of the handle H is illustrated in FIG. 4 in phantom lines. It will be understood, however, that the relative gearing between the beveled gears 24 and 26 can deviate from this value, if desired, to achieve the same result with a different extent of handle movement.

The handle H is provided with a detent pin 36 engageable with a pair of recesses 38 and 40 at the upper end of one of the ears 32 to lock the handle H in the engaged and retracted positions, respectively, of the guide mechanism G. The detent pin 36 extends through openings 42 of the handle frame 28 and is biased toward the ear 32 by a spring 44. The spring is confined between the upper end of the handle frame 28 and a trigger pin 46, which extends through the detent pin 36 for withdrawing the detent pin from the recesses 38 and 40. To disengage the carriage C from the track T, an operator holding the carriage C by the handle H simply pulls upwardly on the trigger pin 46 to withdraw the detent pin 36 from the recess 38, and rotates the handle H to the phantom line position of FIG. 4. The trigger pin 46 is then released, allowing the detent pin 36 to move into the second recess 40 under the influence of the spring 44. The rollers 10 are then in the retracted position illustrated in FIGS. 2 and 5, permitting the carriage C to be moved toward or away from the track T in a direction perpendicular to the wall being cut.

The rollers 10 of FIG. 3 are illustrated as V-shaped rollers having a pair of annular contact surfaces 48 which, in cross-section, each define an angle of approximately forty-five degrees relative to the surface of the wall being cut. These surfaces bear against and ride along a pair of contact surface portions 50 extending along the upper guiding portion 14 of the track T. The contact surface portions 50 are typically flat steel segments whose outer surfaces form a "V" and are oriented ninety degrees apart.

The mounting bracket B is attached to a concrete wall, floor or other structure by a pair of bolts or other suitable fasteners 52. Once the bracket B is mounted, the track T is attached to it by clamping a lower mounting portion 54 of the track within the bracket. The mounting portion 54 has a pair of opposed V-shaped surfaces similar to the surfaces of the upper guiding portion 14, but the lower mounting portion need not have the contact surface portions 50 applied. One side of the mounting portion 54 is received within a channel 56 formed within a main portion 58 of the bracket B, whereas the other edge is received within a channel 59 of a separate, movable portion 60 of the bracket B. The movable portion 60 is drawn toward the main portion 58 of the bracket B by a bolt 62 which clamps the mounting portion 54 of the track T between the two bracket portions 58 and 60. This provides a simple, yet precise method of locating the track T relative to the surface of the wall and thereafter removing the track from the wall W.

Referring now to FIG. 2, the saw assembly of the present invention can be any suitable carriage-mounted saw having guide elements actuable by the guide mechanism described above. In the illustrated embodiment, the track T has a drive rack 64 engaging a drive pinion 66 (FIG. 3) of the carriage C to propel the carriage along the track. Similarly, the saw arm A has a mechanism, preferably powered, for pivoting the arm A relative to the carriage C and thereby moving the saw blade S toward or away from the wall being cut.

In operation, the brackets B are first mounted to a wall to be cut in a desired orientation and the track T is clamped within them. The operator then actuates the guide mechanism G to its retracted position by pulling the triggers 46 and moving the handles H to the phantom line position of FIG. 4 so that the carriage C can be placed on the track T. With the trigger pins 46 released and the detent pins 36 engaging the second recesses 40 to lock the guide mechanisms G in their retracted positions, the operator grasps the carriage C by both of its carrying handles H and places it in position over the track T. He then pulls back on one of the trigger pins 46, allowing the other to remain locked, and pivots the corresponding carrying handle H to the full line position of FIG. 4. This locks two of the rollers 10 in the full line position of FIG. 5 and holds one end of the carriage C against the track T. The operator then draws back on the other trigger pin 46 and rotates its handle H to the engaged position, whereupon the carriage C is fully and securely mounted to the track T. The saw assembly is then used to make a cut of a desired length and depth along the track T. When it is necessary to remove the carriage from the track, the operator simply returns the carrying handles H to the phantom line position of FIG. 4, one at a time, to retract the rollers 10 from the upper guiding portion 14 of the track T. With the handles both locked in the phantom line position of FIG. 4, the carriage can be withdrawn from the track T by a simple movement perpendicularly away from the wall. The saw blade S can even be left in position on the saw assembly, if desired, during withdrawal of the carriage C because it is not necessary to move the carriage C laterally relative to the cut.

Figure 6:
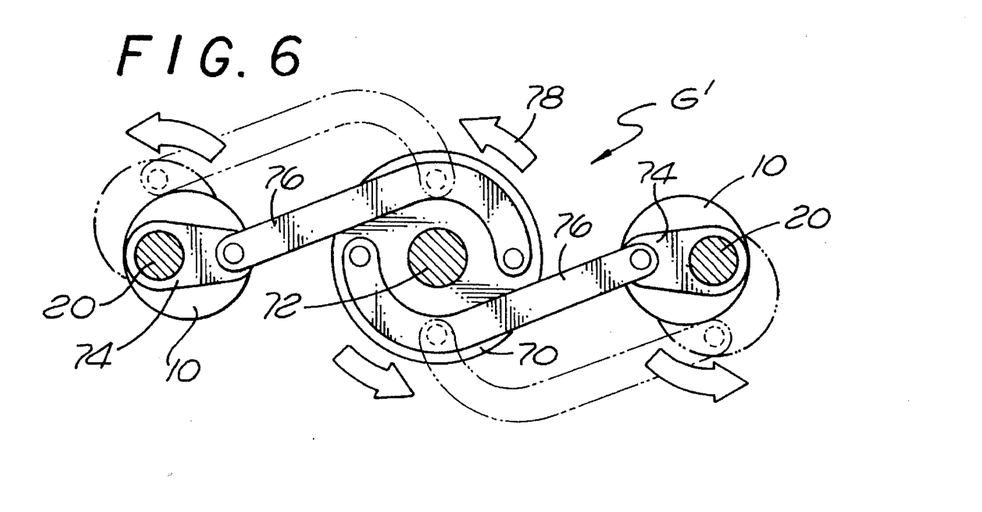
FIG. 6 is a schematic representation of an alternative embodiment of the carrying handle assembly of the invention, in which the guide elements are retracted by pivotal movement of the carrying handle about an axis substantially perpendicular to the surface of the wall or other structure being cut.

An alternative structure of the guide mechanism, designated G', is illustrated in FIG. 6 as having a drive disk 70 which mounts a carrying handle H (not shown) at one end of the carriage C for rotation about a central post 72. The drive disk 70 is connected to a pair of lever arms 74 by drive links 76 pinned to opposite sides of the drive disk. The lever arms 74 are themselves carried for rotation with pivot posts 20 and rollers 10, similar to those of the embodiment illustrated in FIGS. 3–5, so that rotation of the drive disk 70 in the direction of the arrow 78 causes similar rotation of the pivot posts 20 and the rollers 10. This cams the rollers 10 outwardly away from the track T (not shown) until the rollers 10, the lever arms 74 and the drive links 76 assume the phantom line positions of FIG. 6. Thus, a simple rotation of the handle H (not shown) about an axis perpendicular to the wall being cut retracts and reengages the rollers 10.

Figure 7:
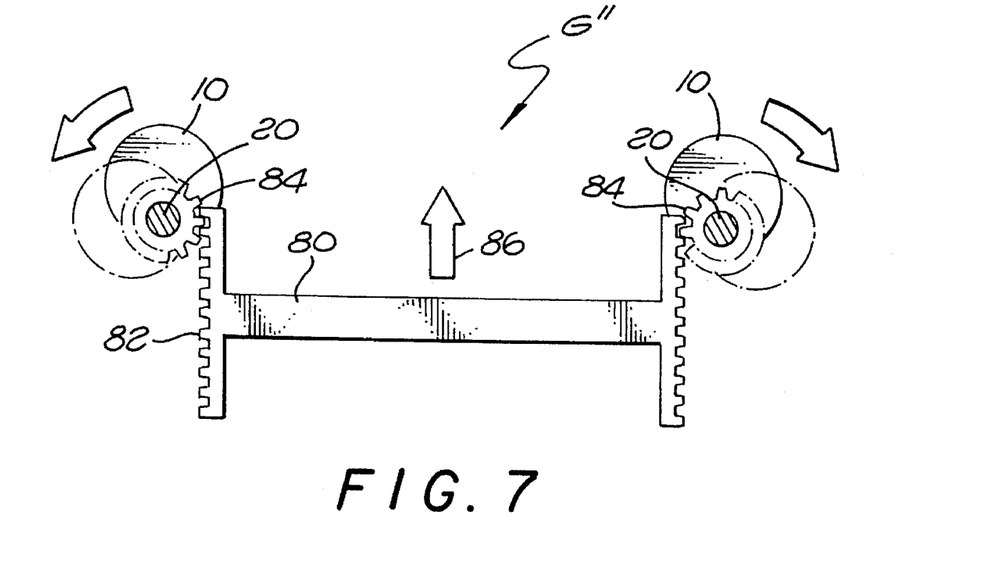
FIG. 7 is a schematic representation of another embodiment of the carrying handle assembly of the invention, in which the guide elements are retractable by displacing the carrying handle in a direction substantially parallel to the surface of the wall other structure being cut.

Referring now to FIG. 7, a further embodiment of the guide mechanism, designated G", has a handle frame 80 with a rack portion 82 on either end for driving pinion gears 84 associated with pivot posts 20 and rollers 10 similar to those described above. Thus, displacement of the handle frame 80 in a direction 86 parallel to the track T (not shown) cams the rollers 10 inwardly and outwardly relative to the track between the engaged and retracted positions thereof.

Figure 8:
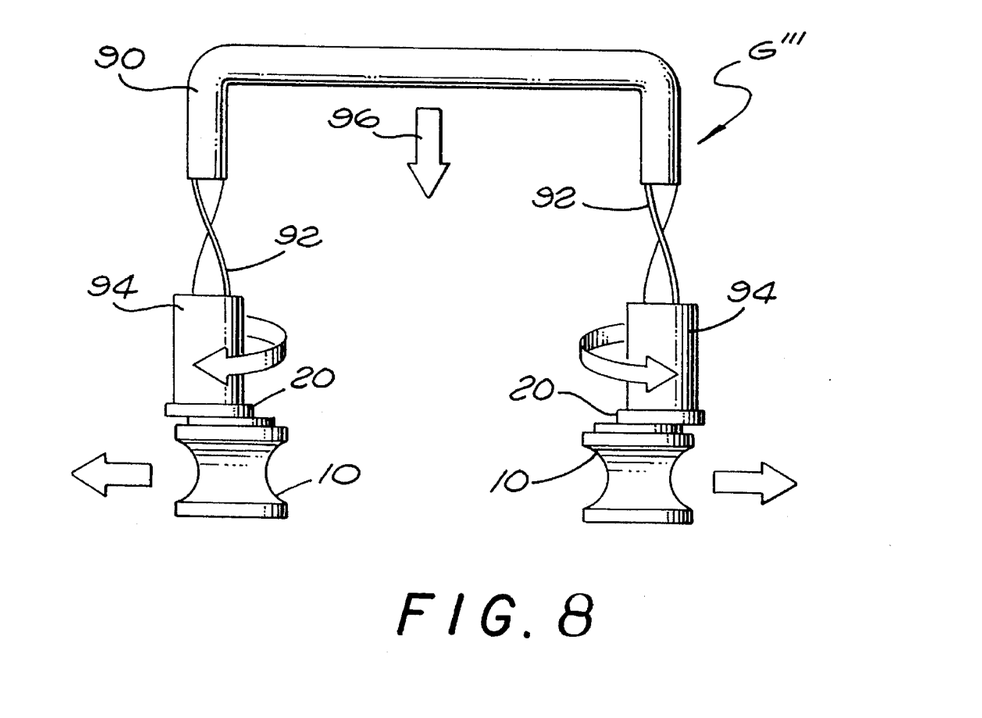
FIG. 8 is a schematic representation of a further embodiment of the carrying handle assembly of the invention, in which the guide elements are releasable by displacing the carrying handle in a direction substantially perpendicular to the surface of the wall or other structure being cut.

A further embodiment of the guide mechanism, designated G''', is illustrated in FIG. 8 The mechanism G''' has a handle frame 90 with a pair of helical drive elements 92 at opposite ends thereof engaging complementary driven elements 94 for rotation when the handle frame 90 is displaced in the direction of the arrow 96 toward the surface being cut. This rotates the pivot post 20, camming the rollers 10 inwardly and outwardly relative to the track, to actuate the mechanism between its engaged and retracted positions. It will be noted that the rollers 10 illustrated in FIG. 8 are U-shaped in cross-section, rather than V-shaped, as illustrated in the embodiment of FIG. 3. The track T (not shown) is then similarly U-shaped so that it can be smoothly and accurately engaged by the rollers 10. It will be understood, however, that the precise shape of the rollers and the track itself may vary as long as the rollers engage the track in a precision manner. The U-shaped rollers of FIG. 8, and even flat or differently shaped rollers, may be used in any of the embodiments of the present invention as long as the rollers and track are complementary.

From the above, it can be seen that the present invention defines a wall saw which is relatively simple in structure, yet easy to use.

The appended claims are not limited to the embodiments described herein, but rather are intended to cover all variations and adaptations falling within the true scope and spirit of the present invention.

What is claimed is:

1. A saw assembly comprising:

a track mountable to a wall, floor or ceiling;

a carriage guided by the track for movement along the length of the track, the carriage including a cutting mechanism and a carrying handle for manually grasping the carriage; and a guide mechanism removably securing the movable carriage to the track, the guide mechanism comprising a pair of guide elements mounted on opposite sides of the carriage for pivotal movement in substantially opposite directions between an engaged position, in guiding contact with the track, and a retracted position, out of contact with the track, by movement of said carrying handle.

2. The saw assembly of claim 1 wherein:

said guide elements are retracted sufficiently in said retracted position to permit mounting and dismounting of the carriage relative to the track by movement of the carriage in a direction substantially perpendicular to the wall, floor or ceiling.

3. The saw assembly of claim 1, wherein:

the guide elements move between said engaged and retracted positions in a pivotal camming motion.

4. The saw assembly of claim 3, wherein:

each of said guide elements is a roller engaging a contact surface of the track when the carriage is secured to the track in said engaged position.

5. The saw assembly of claim 4 wherein:

each of said rollers has a primary axis of rotation and is mounted for said pivotal camming motion about a secondary axis displaced from said primary axis.

6. The saw assembly of claim 4, wherein:

each of said rollers has a V-shaped contact surface engageable with a complementary contact surface of the track in said engaged position.

7. The saw assembly of claim 4, wherein:

each of said rollers has a U-shaped contact surface engageable with a complementary contact surface of the track in said engaged position.

8. The saw assembly of claim 4, wherein:

each of said rollers has a substantially concave contact surface engageable with a substantially convex complementary contact surface of the track in said engaged position.

9. The saw assembly of claim 5 wherein:

the guide mechanism is actuable between said engaged and retracted positions by pivotal movement of said at least one carrying handle.

10. The saw assembly of claim 9 wherein:

said at least one carrying handle is pivoted about a handle pivot axis transverse to the track.

11. The saw assembly of claim 10 wherein:

said handle pivot axis is substantially parallel to the surface of the wall, floor or ceiling to be cut.

12. The saw assembly of claim 9 wherein:

said guide mechanism comprises at least one gear train linking said at least one carrying handle with said rollers.

13. The saw assembly of claim 11 wherein:

said at least one carrying handle is mounted to the carriage for said pivotal movement; and the guide mechanism comprises a first gear mounted for rotation with said carrying handle about said handle pivot axis, and a second gear engaging the first gear to drive one of said rollers for pivotal camming motion about said secondary axis.

14. The saw assembly of claim 10 wherein:

said handle pivot axis is substantially perpendicular to the surface of the wall, floor or ceiling to be cut.

15. The saw assembly of claim 14 wherein:

said guide mechanism comprises at least one connecting link for converting rotational movement of said at least one carrying handle into pivotal camming motion of said rollers.

16. The saw assembly of claim 5 wherein:

said guide mechanism is actuable between said engaged and retracted positions by displacing said at least one carrying handle in a direction substantially parallel to the surface of the wall, floor or ceiling to be cut.

17. The saw assembly of claim 16 wherein:

said guide mechanism comprises a rack and pinion mechanism for converting displacement of said at least one carrying handle into pivotal camming motion of said rollers.

18. The saw assembly of claim 5 wherein:

said guide mechanism is actuable between said engaged and retracted positions by displacing said at least one carrying handle in a direction substantially perpendicular to the surface of the wall, floor or ceiling to be cut.

19. The saw assembly of claim 18, wherein:

said guide mechanism comprises a helical drive structure for converting displacement of said at least one carrying handle into pivotal camming motion of said rollers.

20. The saw assembly of claim 1, wherein:

said guide mechanism includes a detent structure for releasably locking said at least one carrying handle in positions corresponding to said engaged and retracted positions of the guide mechanism.

21. The saw assembly of claim 20 wherein:

said detent structure comprises at least one detent pin on the carrying handle engaging different detent recesses of the carriage in said engaged and retracted positions of the guide mechanism, the detent pin being manually retractable to permit actuation of the guide mechanism between said positions.

22. The saw assembly of claim 1, wherein the cutting mechanism comprises:

a saw blade;

a saw arm mounted to the carriage for holding the saw blade in a cutting position; and a saw motor acting through the saw arm to drive the saw blade in a cutting action.

23. A saw assembly comprising:

a track mountable to a surface of a wall, floor or ceiling;

a carriage guided by the track for movement along the length of the track, the carriage including a cutting mechanism and at least one carrying handle for manually grasping the carriage; and a guide mechanism removably securing the movable carriage to the track, the guide mechanism comprising a plurality of rollers mounted to the carriage for pivotal movement between an engaged position, in guiding contact with the track, and a retracted position, out of contact with the track, by pivotal movement of said at least one carrying handle about an axis substantially parallel to the surface of the wall, floor or ceiling to be cut.

24. A saw assembly comprising:

a track mountable to the surface of a wall, floor or ceiling;

a carriage guided by the track for movement along the length of the track, the carriage including a cutting mechanism and at least one carrying handle for manually grasping the carriage; and a guide mechanism removably securing the movable carriage to the track, the guide mechanism comprising a plurality of rollers mounted to the carriage for pivotal movement between an engaged position, in guiding contact with the track, and a retracted position, out of contact with the track, by pivotal movement of said at least one carrying handle; and said guide mechanism comprising at least one gear train linking said at least one carrying handle with said rollers.

25. The saw assembly of claim 24 wherein:

the guide mechanism comprises a first gear mounted for rotation with said carrying handle about said handle pivot axis, and a second gear engaging the first gear to drive one of said rollers for pivotal camming motion about said secondary axis.

26. A saw assembly comprising:

a track mountable to the surface of a wall, floor or ceiling;

a carriage guided by the track for movement along the length of the track, the carriage including a cutting mechanism and at least one carrying handle for manually grasping the carriage; and a guide mechanism removably securing the movable carriage to the track, the guide mechanism comprising a plurality of rollers mounted to the carriage for pivotal movement between an engaged position, in guiding contact with the track, and a retracted position, out of contact with the track, by pivotal movement of said at least one carrying handle; and said guide mechanism comprises at least one connecting link for converting rotational movement of said at least one carrying handle into pivotal camming motion of said rollers.

27. A saw assembly comprising:

a track mountable to the surface of a wall, floor or ceiling;

a carriage guided by the track for movement along the length of the track, the carriage including a cutting mechanism and at least one carrying handle for manually grasping the carriage; and a guide mechanism removably securing the movable carriage to the track, the guide mechanism comprising a plurality of rollers mounted to the carriage for pivotal movement between an engaged position, in guiding contact with the track, and a retracted position, out of contact with the track, by pivotal movement of said at least one carrying handle; and said guide mechanism comprises a rack and pinion mechanism for converting displacement of said at least one carrying handle into pivotal camming motion of said rollers.

28. A saw assembly comprising:

a track mountable to the surface of a wall, floor or ceiling;

a carriage guided by the track for movement along the length of the track, the carriage including a cutting mechanism and at least one carrying handle for manually grasping the carriage; and a guide mechanism removably securing the movable carriage to the track, the guide mechanism comprising a plurality of rollers mounted to the carriage for pivotal movement between an engaged position, in guiding contact with the track, and a retracted position, out of contact with the track, by pivotal movement of said at least one carrying handle; and said guide mechanism is actuable between said engaged and retracted positions by displacing said at least one carrying handle in a direction substantially perpendicular to the surface of the wall, floor or ceiling.

29. The saw assembly of claim 28 wherein:

said guide mechanism comprises a helical drive structure for converting displacement of said at least one carrying handle into pivotal camming motion of said rollers.

30. A saw assembly comprising:

a track mountable to the surface of a wall, floor or ceiling;

a carriage guided by the track for movement along the length of the track, the carriage including a cutting mechanism and at least one carrying handle for manually grasping the carriage; and a guide mechanism removably securing the movable carriage to the track, the guide mechanism comprising a plurality of rollers mounted to the carriage for pivotal movement between an engaged position, in guiding contact with the track, and a retracted position, out of contact with the track, by pivotal movement of said at least one carrying handle; and said guide mechanism includes a detent structure for releasably locking said at least one carrying handle in positions corresponding to said engaged and retracted positions of the guide mechanism.

31. The saw assembly of claim 30 wherein:

said detent structure comprises at least one detent pin on the carrying handle engaging different detent recesses of the carriage in said engaged and retracted positions of the guide mechanism, the detent pin being manually retractable to permit actuation of the guide mechanism between said positions.

* * * * *

UNITED STATES PATENT AND TRADEMARK OFFICE
CERTIFICATE OF CORRECTION

PATENT NO. : 5,588,418
DATED : December 31, 1996
INVENTOR(S) : William K. Holmes et al.

It is certified that error appears in the above-indentified patent and that said Letters Patent is hereby corrected as shown below:

```
Column 5, line 31, insert --.-- after "FIG. 8";

Column 7, line 42, after "to", delete "a" and
```
substitute therefor --the--.

Signed and Sealed this

Twenty-sixth Day of August, 1997

Attest:

BRUCE LEHMAN

Attesting Officer

Commissioner of Patents and Trademarks